(12) United States Patent
Jeannin et al.

(10) Patent No.: US 6,289,948 B1
(45) Date of Patent: Sep. 18, 2001

(54) REFILL CARTRIDGE FOR A DRINK DISPENSING DEVICE AND DEVICE DESIGNED FOR SUCH A CARTRIDGE

(75) Inventors: Bernard Jeannin, Lausanne; Petr Masek, Granges; Ennio Bardin, Orbe, all of (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/497,457

(22) Filed: Feb. 3, 2000

(30) Foreign Application Priority Data

Feb. 12, 1999 (EP) .................................................. 99200394

(51) Int. Cl.⁷ .............................. B65B 1/04; B65B 3/00; B67C 3/00
(52) U.S. Cl. ........................ 141/351; 141/352; 141/363; 141/364; 141/365; 141/366; 99/295
(58) Field of Search ..................................... 141/351, 352, 141/363, 364, 365, 366; 99/295; 426/431, 432, 433

(56) References Cited

U.S. PATENT DOCUMENTS

| | | | |
|---|---|---|---|
| 3,812,273 | 5/1974 | Schmidt | 426/433 |
| 4,491,161 * | 1/1985 | Tamura et al. | 141/364 |
| 4,523,834 * | 6/1985 | Pelda et al. | 355/3 DD |
| 4,799,591 | 1/1989 | Tajima et al. | 206/455 |
| 5,169,137 | 12/1992 | Matsuda et al. | 271/145 |
| 5,237,910 | 8/1993 | Chigira | 99/282 |
| 6,117,471 * | 9/2000 | King | 426/433 |

FOREIGN PATENT DOCUMENTS

| | | |
|---|---|---|
| 0 387 986 A2 | 9/1990 | (EP) . |
| 0 419 290 A2 | 3/1991 | (EP) . |
| 1325478 | 8/1973 | (GB) . |

* cited by examiner

Primary Examiner—Timothy L. Maust
(74) Attorney, Agent, or Firm—Winston & Strawn

(57) ABSTRACT

A food substance refill element for an automatic fluid dispensing device. The refill element includes a receptacle containing a quantity of the substance to be refilled into the fluid dispensing device and a closing member that cooperates with the receptacle to form a hermetically enclosed chamber. The closing member includes a detachment portion so that the closing member is at least partially detached from the receptacle when the refill element is introduced into the automatic fluid dispensing device or after the refill element has been introduced in the automatic fluid dispensing device. The invention also relates to a fluid dispensing device for use with the refill element.

35 Claims, 6 Drawing Sheets

REFILL CARTRIDGE FOR A DRINK DISPENSING DEVICE AND DEVICE DESIGNED FOR SUCH A CARTRIDGE

TECHNICAL FIELD

The invention is directed at devices for automatically dispensing drinks, sauces or other fully prepared products on demand. In particular, the invention is concerned with dispensing devices that use pulverized substances, such as soluble powders of coffee, tea, chocolate, and the like, and which are to be refilled regularly. Advantageously, the invention is concerned with drink-dispensing devices used for serving passengers in aircraft, trains or other means of transport that benefit from a catering service. The invention is also directed to devices for automatically dispensing drinks, which are installed in public places, and are equipped with a slot for accepting coins.

BACKGROUND ART

Drink-dispensing devices and the like have to be supplied with soluble pulverized substances regularly and in sufficient quantity to ensure that several consumers can be served in succession. In general, the pulverized powder is supplied by manually filling a reservoir in the dispenser with the powder packaged "in bulk", for example, by means of a metering device or a bag. This method, however, is unsatisfactory, since it requires an investment of work time by the person carrying out the task. In addition, manually filling a reservoir may be messy. This is particularly problematic when the reservoir has to be filled under unstable or turbulent conditions, as may be the case in an aircraft. Manually filling a reservoir may also result in an appreciable loss of powder. Furthermore, the distribution of the powder in the metering system (for example, a metering screw) may be variable, depending on the circumstances and, thus, may lead to considerable variation in the concentrations of the dispensed products.

There are dispensers designed for receiving cartridges or containers which are filled with soluble pulverized substances that are opened before being introduced into the dispensing device. The document, GB 1,325,478, for example, teaches such a principle. In this particular case, the container comprises an adhesive tape which is delaminated before the container is placed in the device. Since the container is placed in the device after it is completely opened the above-mentioned disadvantages are not avoided.

There are also automatic dispensing devices, such as those disclosed in U.S. Pat. No. 5,237,910, where the pulverized material is contained in a bag and the bag is opened by cutting the bottom of the bag by with a cutting system housed inside the device. Such a system, however, is relatively complicated and costly. Moreover, the system is too bulky to be used in a restricted space, such as on an aircraft.

Therefore, there is a real need to have a method for refilling dispensers with pulverized substances or the equivalent, that is simple and quick to use, does not result in any loss of material, and, if appropriate, can be put into practice in a restricted space.

The object of the present invention is to fulfill these expectations by providing a refill element that is designed to release its substance in the device, without having to open the refill element prior to placing it in the device and without using a cutting system incorporated in the dispensing device.

SUMMARY OF THE INVENTION

The invention relates to a refill element for an automatic fluid dispensing device and a device for automatically dispensing a fluid mixed with a substance.

The refill element for an automatic fluid dispensing device includes a receptacle having a periphery within which is contained a predetermined quantity of a substance to be filled into the device and a closing means or closing member that cooperates with the receptacle to form an enclosed chamber. The closing means includes a detachment means or detachment portion that engages a retaining part on the device to at least partially detach the closing means from the receptacle either when the refill element is introduced into the dispensing device or after the refill element has been introduced into the device.

The detachment means may be formed from a free portion of the closing means. Preferably, the free portion is an extension of the closing means that extends beyond the periphery of the receptacle. The detachment means engages the retaining part of the device when the refill element is introduced into the device. The retaining part is complementary to the detachment means, so as to keep the free portion in place when the refill element is introduced into the dispensing device. In one embodiment the detachment means is at least one projecting portion on the free portion and the retaining part is a complementary edge of the device, so that the at least one projecting portion forms an abutment that bears on the complementary edge of the dispensing device when the refill element is introduced into the device. In another embodiment the detachment means is at least one hole formed in the free portion and the retaining part is a complementary rod portion on the device, so that the at least one hole engages with the complementary rod portion when the refill element is introduced into the device.

The closing means may include an actual closing portion, that cooperates with the receptacle to form an enclosed chamber; and a free portion superposed with respect to the actual closing portion, wherein the free portion has a first end and a second end, the first end being located on the side of the receptacle that is introduced into the device and is connected to the closing means so as to form a folded-back edge, and the second end extends beyond the side of the receptacle that is opposite to the side introduced into the receptacle and is capable of being reached manually after the refill element has been introduced into the device.

The receptacle may be in the form of an elongated tray having a cross section of substantially trapezoidal shape, wherein the larger base of the trapezoid is extended in a substantially identical plane by lateral edges, to which the closing means are detachably connected. The lateral edges may extend over the entire periphery of the larger base of the trapezoid.

The closing means may be a flexible film joined by adhesion or sealing to the lateral edges of the receptacle so that the closing means can be detached from the receptacle by delaminating at least a portion of the film from the edges of the receptacle. The flexible film may be a moisture-resistant or tear-resistant material. The flexible film may be heat-sealed to the lateral edges of the receptacle.

The receptacle may be made from plastic by thermoforming, injection, extrusion blow-moulding, or injection blow-moulding plastic.

The substance may be a pulverized or powdered food substance useful for the preparation of drinks. The pulverized food substance may be one or more of roasted or ground coffee; soluble coffee; tea; chocolate-containing drinks; milk; and flavored drinks based on fruits, herbs, sugar, leguminous plants, and natural or artificial aromas.

The invention also relates to an apparatus for automatically dispensing a fluid mixed with a substance. The apparatus includes at least one substance-supply subassembly for supplying a substance to be mixed with a fluid. The substance-supply subassembly includes: a housing for receiving at least one above-described refill element by sliding the refill element into the housing when the refill element is oriented so that the closing means at least partially forms the bottom of the refill element; at least one receiving means for receiving the substance, the receiving means being located below the refill element so that the food substance falls into the receiving means when the closing means is detached from the receptacle; a means for metering the substance in the receiving means into a mixing bowl; and a retaining means that engages with the detachment means on the refill element when the refill element is slid into the housing to at least partially detach the closing means from the refill element.

The apparatus may further include a fluid supply to supply fluid to the mixing bowl and a dispensing outlet for dispensing the substance dispersed or dissolved in the fluid. The apparatus may further include a mashing chamber comprising an agitation means or agitator for the production of froth, located between the mixing bowl and the dispensing outlet.

The metering means may be a screw arranged horizontally and substantially oriented in the vertical plane in which the refill element extends longitudinally.

The housing may include a guide means in the form of two laterally spaced rails to ensure that the refill element slides in a substantially horizontal plane when inserted into the subassembly.

The retaining means may be at least one transverse edge of the housing that the detachment means comes into abutment with when the refill element is introduced into the housing. The retaining means may also be at least one rod portion onto which the detachment means engages when the refill element is being introduced into the housing.

The means for receiving the substance may be a funnel or hopper having widened edges.

The apparatus may include a plurality of supply subassemblies wherein the subassemblies are arranged parallel to each other and in communication with a common mixing bowl.

The a housing may be arranged to receive more than one refill element arranged in a vertical stack after they are introduced into the device.

The invention also relates to a drink-dispensing apparatus. The drink-dispensing apparatus includes at least one refill element for filling the dispensing device with a pulverized substance. The refill element preferably comprises a receptacle in the form of an elongated tray containing the pulverized substance within its periphery and a detachable film that cooperates with the refill element to form an enclosed chamber. The film has a foldable free portion that extends beyond the periphery of the receptacle. The free portion is advantageously provided with the detachment means. The dispensing device also comprises a housing for receiving the refill element and a retaining means which engages the detachment means when the refill element is introduced into the housing. Thus, the movement of introducing the refill element into the housing causes the film to be delaminated from the refill element so that the substance is released into the dispensing device by gravity.

DETAILED DESCRIPTION OF THE PREFERRED EMBODIMENTS

Figure 1:
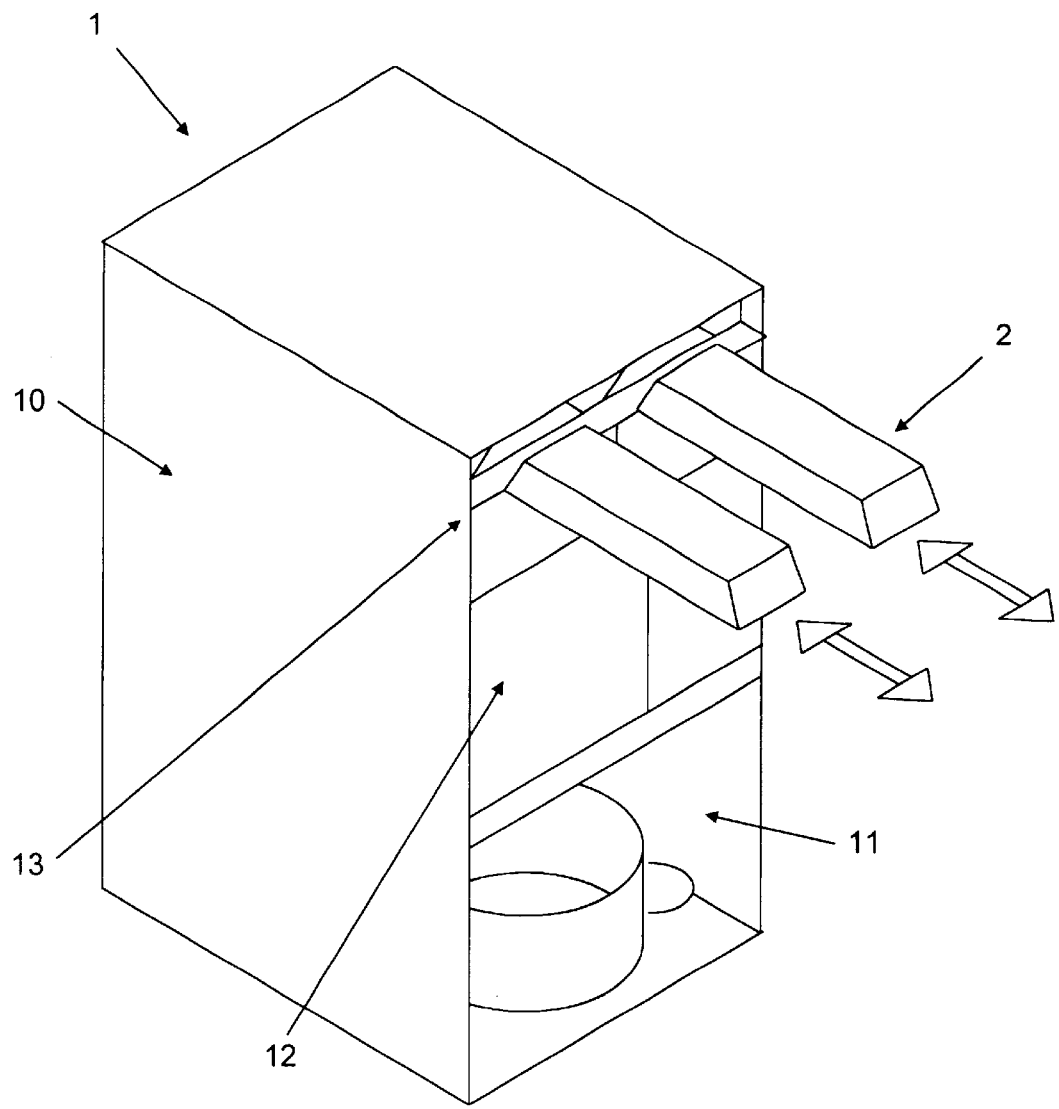
FIG. 1 illustrates a diagrammatic perspective view of a dispensing device of the invention comprising two partially inserted refill elements.

The dispensing device is a machine for dispensing hot drinks of coffee or the like, which can be installed in a small-sized space provided for this purpose, such as, for example, in the reserved space of an aircraft. FIG. 1 illustrates a preferred embodiment of the device. The device comprises a body (10) forming the frame of the device, an open drink-dispensing zone (11) located at the base of the dispenser, a panel (12) provided with preselection buttons (not shown) and an infeed zone (13) for the sliding engagement of tray-shaped refill elements (2) according to the invention.

FIGS. 2 and 4 to 6 illustrate a first embodiment of the invention. The refill element (2) is intended to be inserted into a housing (14) of substantially complementary shape which is formed in the infeed zone (13) of the device. The refill element (2) has a receptacle (20) containing a particular quantity of substance to be refilled such as coffee, tea, milk, or the like in pulverized form. The quantity of substance contained in the receptacle may vary, depending on the dimensions of the receptacle and the specific gravity of the product. The quantity may be determined as a function of the number of individual product portions intended to be provided after metering by a metering means of the device. For example, from about 1 to 200 individual portions may be considered. The bottom of the refill element is formed by a closing means (25), in such a way that the mass of substance to be refilled rests directly on the closing means when the refill element is in the configuration depicted in FIG. 2. The refill element (2) formed by the receptacle (20) and the closing means (25) defines a ermetically enclosed chamber.

In a preferred embodiment the closing means (25) is a flexible film joined by adhesion or by sealing to the edges (21) of the receptacle (20). The folded-back lateral edges (21) of the receptacle (20) extend preferably over the entire periphery of the receptacle (20) forming a tray, so as to assist the support, stability and guidance of the tray in the device. Advantageously, the closing means (25) is in the form of a film that is heat-sealed to the lateral edges (21) of the receptacle (20).

Figure 2:
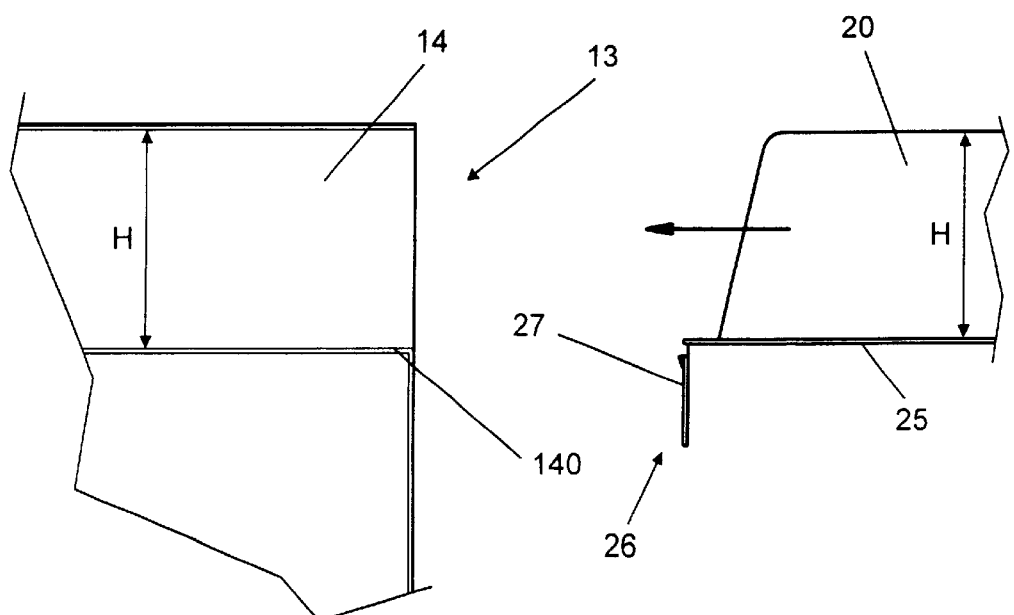
FIG. 2 shows a diagrammatic view of the principle of insertion of the refill element of the invention into the dispensing device, according to a first embodiment.

As shown more particularly in FIG. 2, the closing means (25) is extended beyond the front of the refill element (2) by a free portion (26) which partially extends beyond the receptacle. By "free portion" is meant a portion having a free end, i.e., a portion not adhered to the lateral edges (21) of the receptacle (20), when the receptacle (20) is not engaged in the device. This portion is flexible so that it can be folded back against the surface of the closing means or film (25). The free portion (26) may simply be an extension of the closing means or film (25). One feature of the invention is that the free portion (26) comprises a mechanical catching means (27) formed from at least one projecting portion (28). The projecting portion (28) forms an abutment intended to come to bear on a complementary edge (140) delimiting the entrance of the housing (14) of the dispensing device (1). The housing (14) possesses an upper wall (142) which, with the lower edge (140), defines a height H which, bearing in mind the dimensional tolerances, allows the sliding engagement of the refill element (2) with the exception of the catching means (27). Thus, the height H corresponds to the height H of the refill element (2), i.e., the height of the receptacle together with its edges (21).

Figure 5:
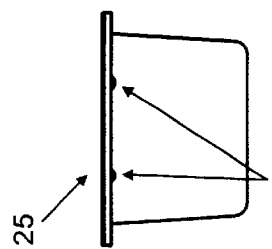
FIG. 5 is a front view of the refill element according to the first embodiment corresponding to FIG. 2.
Figure 4:
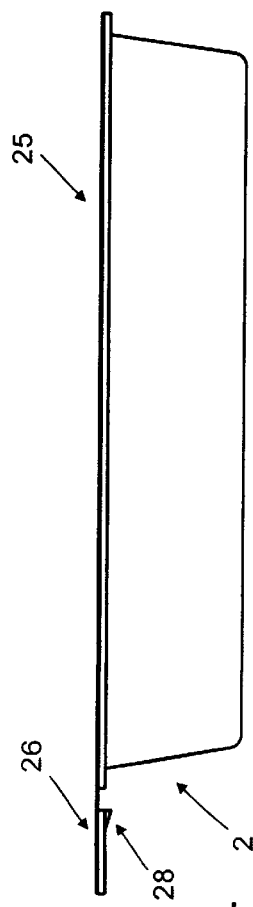
FIG. 4 is a side view of a refill element according to the first embodiment corresponding to FIG. 2.

The catching means (27) may be a plate made of semi-rigid or rigid plastic adhesively bonded or welded to the closing means or flexible film (25), so as to be resistant to delamination, and interrupted with respect to the edge of the receptacle (20) so as to preserve a non-covered and foldable flexible film zone (29). As shown in FIG. 5, the catching means (27) may comprise two abutments (28) spaced laterally from one another. In another variant, which is not illustrated, the catching means could be a continuous projecting edge extending over the entire width of the free portion (26) or any other equivalent means.

Installing the refill element (2) is particularly simple. Installing the refill element (2) merely involves putting the front of the refill element (2) in place at the entrance of the housing, so as to cause the free portion (26) to be folded back along the flexible zone (29) so that the downward facing projecting portion (28) is then prevented from entering the entrance of the housing by the edge (140) of the housing. Sufficient force is then applied to drive the receptacle (20) into the housing, the closing means (25) being detached as a result of the effect of delaminating the film along the sealed edges (21) of the receptacle. Delamination may be obtained on only a portion of the length of the receptacle. In this case, delamination may be completed manually. Alternatively, delamination may be carried out over the entire length of the receptacle. As delamination occurs, the substance is released into the device due to gravity. Since the delaminated refill element (20) is in an internal position with respect to the transverse edge (140) there is no risk of spillage outside the device.

Figure 6:
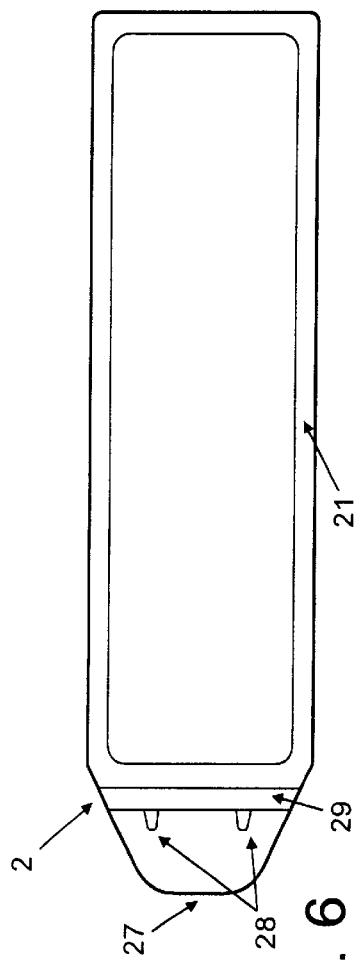
FIG. 6 is a top view of the refill element according to the first embodiment corresponding to FIG. 2.

As shown in FIGS. 5 and 6, the receptacle (2) may be in the form of an elongated tray having a cross section of substantially trapezoidal shape, the larger base of the trapezoid being prolonged in a substantially identical plane by lateral edges (21), to which the closing means (25) is detachably connected. The specific cross-sectional shape of the tray is adapted to the shape of the housing, so as to allow only a single direction of engagement and eliminating any risk of engagement error.

Figure 3:
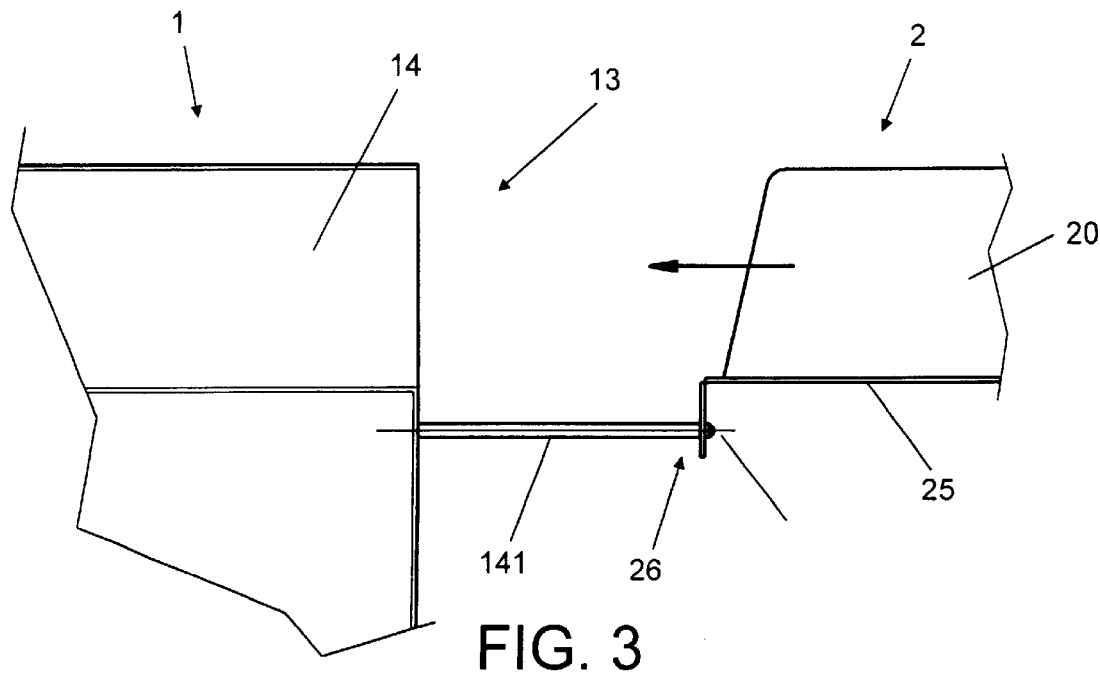
FIG. 3 shows a diagrammatic view of the principle of insertion of the refill element of the invention into the dispensing device according to a second embodiment.
Figure 7:
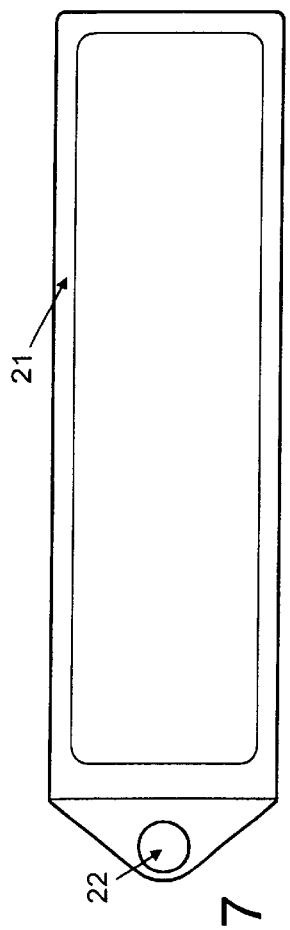
FIG. 7 is a top view of the refill element according to the second embodiment corresponding to FIG. 3.

FIGS. 3 and 7 show another embodiment of the invention, in which the catching means comprises at least one hole (22) formed in the free portion (26) of the catching means and intended for engaging onto a complementary rod portion (141) of the dispensing device (1). The opening of the receptacle is therefore based on a principle similar to that of the previous case.

According to one embodiment of the invention, the flexible film is preferably produced from moisture-resistant and tear-resistant material. Preferably, the film is a laminate comprising an aluminium film lined on the inside with a film of heat-meltable material, so as to assist in joining the film to the edges (21) of the receptacle (20).

Preferably the receptacle (20) is a plastic based material formed by thermoforming, injection, extrusion blow-moulding, injection blow-moulding, and the like.

Figure 8:
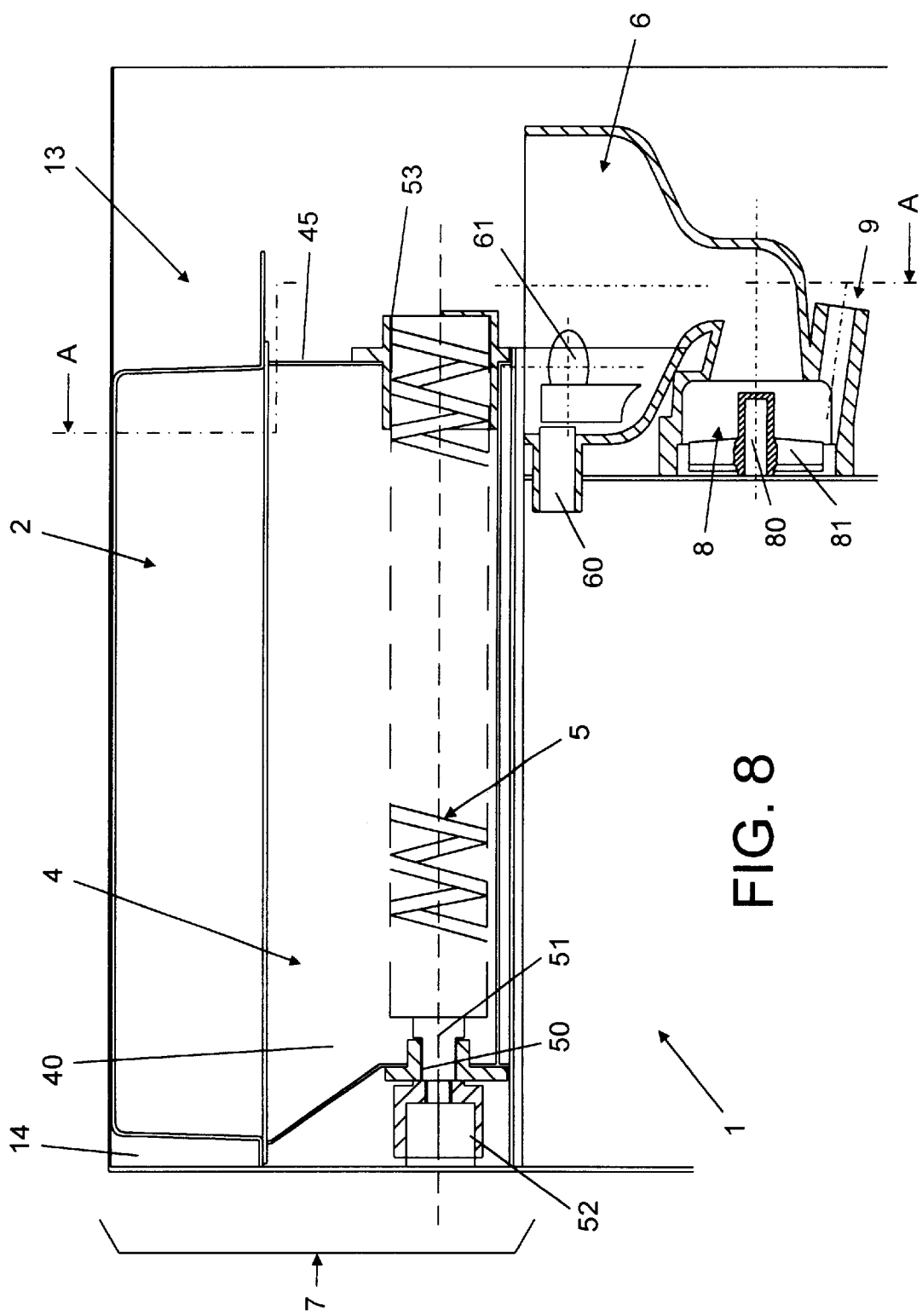
FIG. 8 is a partial view, in longitudinal section, of the dispensing device when the refill element is in place in the device.
Figure 9:
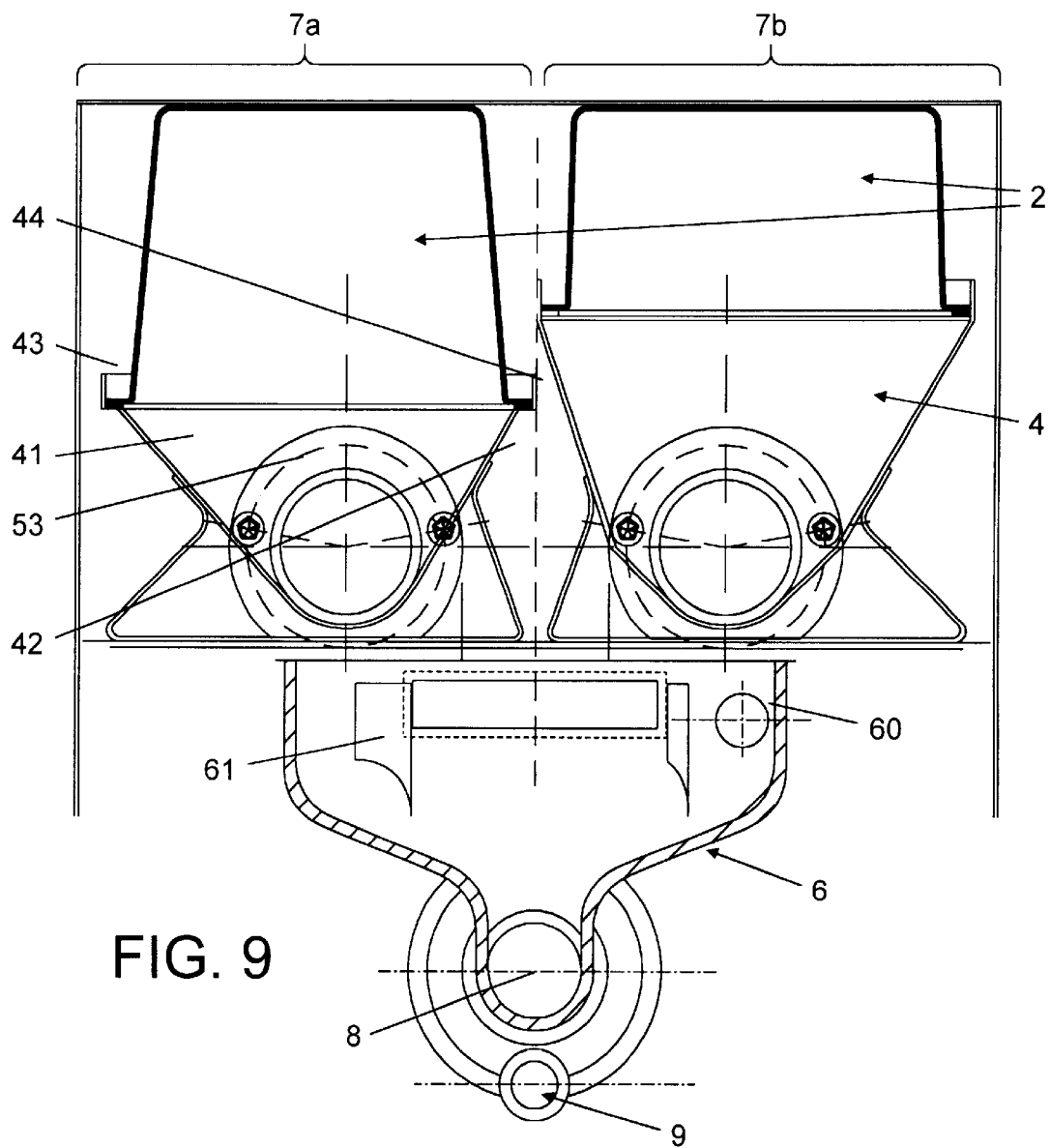
FIG. 9 is a sectional view, along the line A—A, of the device illustrated in FIG. 8.

FIGS. 8 and 9 illustrate an example of a dispensing device to which the invention refers. The device comprises a subassembly (7) for the supplying a pulverized substance. The subassembly includes an infeed zone (13) which forms the upper part of the body of the device and in which is arranged the housing (14) for receiving the refill element (2). The refill element (2), in an upturned position, is slid into the housing so that the receptacle (20) has its opening directed downwards when it is freed of its closing means (25). The housing has a shape and/or dimensional configuration such that the element cannot be introduced in the other direction, i.e., with the closing means directed upwards.

Below the refill element (2) is located a means for receiving the food substance (4), the receiving means (4) serves to collect the substance falling into the device due to gravity. Preferably, this receiving means (40) is a hopper (also called a "canister") provided with widened edges (40), (41), and (42). When particularly sticky substances are being used, it may be necessary to provide straight edges in order to avoid any undesirable caking of the substance. An accessory system intended for breaking up the powder may, of course, be added, if necessary. A representative example of one such accessory system would be a gear wheel driven by meshing with the screw.

The receiving means (4) leads the pulverized substance directly onto a metering means (5), the function of which is to meter the desired quantity of substance into a mixing chamber (6). Such metering means are well known in the art. Preferably the metering means consists of a metering screw located at the bottom of the hopper. The screw may be of the spiral type, such as a wire in the form of a helical spiral. It may also be a screw comprising a solid core structured externally with a helical rib of predetermined pitch.

Advantageously, the metering screw is arranged horizontally and is substantially oriented in the vertical plane in which the refill element (2) extends longitudinally. Such a relative arrangement of the screw and of the refill element (2) contributes to a good distribution of the pulverized substance in the device at the moment it is released; as a consequence metering accuracy is improved The screw is mounted on a shaft portion (50) supported by a bearing (51). The shaft portion is connected to a stub (52) to associate it with a motorized drive device (not illustrated). A support element (53) is provided at the opposite end of the screw for holding the screw. The support element (53) comprises an orifice for pouring the powder. The support element (53) is connected to the front wall (45) of the hopper by fastening means.

As shown in FIG. 9, a plurality of supply subassemblies (7a) and (7b) may be arranged in parallel, thus making it possible for the device to accommodate a plurality of refill elements (2), capable of containing different pulverized substances, with each communicating with a common mixing bowl (6). The refill elements (2) may have different volumes.

The refill elements (2) are guided in their housing by guide means (43) and (44) in the form of laterally spaced rails, thus ensuring that the refill elements (2) are slid in a substantially horizontal plane. The guide means (43) and (44) may, as illustrated, have horizontal wall portions ensuring planar support on the edges (21) of the refill elements (2) and vertical portions ensuring longitudinal guidance, the horizontal and vertical portions being wide-angled.

The mixing bowl (6) is supplied with water (60) by means of a supply. It is possible to provide a separate supply of hot and cold water. The device may also comprise its own water-heating system (not illustrated). Baffle and separation elements (61) may advantageously be provided for assisting the mixing of the various substances.

The bowl is prolonged downwards by a mashing (or beating) chamber (8) which comprises an agitation means. The agitation means takes the form of a rotary member provided with a rotor (80) and blades (81). The mashing chamber (8) is generally enclosed. The function of the mashing chamber (8) is to produce a layer of froth on the surface of the dispensed drink. The agitation means may be deactivated for some preparations where the production of froth is not desired. The prepared product is subsequently dispensed through an outlet duct (9) located at the bottom of the device.

In one variant of the device, not illustrated, an assembly of a plurality of refill elements in a vertically stacked configuration may be provided, each element being engaged according to the same principle as that just described. In this case, any element having an element above it will have an orifice in its upper surface to allow the passage of the substance from the element located above it. The orifice in the upper surface of an element may be provided according to the same principle as the closing means is delaminated from the receptacle. In this case, the receptacle may have two opposite closing means, one forming the upper surface of the element and the other forming the lower surface of the receptacle. The advantage of having a plurality of elements is that it affords greater flexibility when supply the dispensing device.

Figure 11:
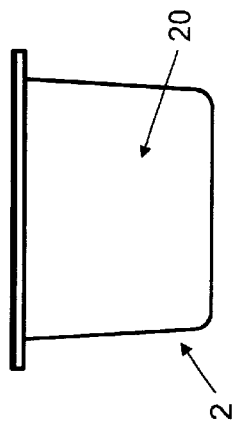
FIG. 11 is a front view of the refill element according to the third embodiment corresponding to FIG. 10.
Figure 10:
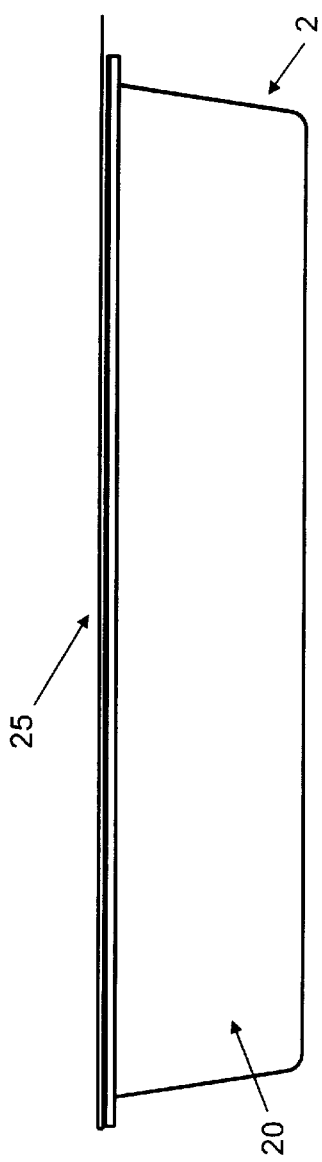
FIG. 10 is a side view of a refill element according to a third possible embodiment.
Figure 12:
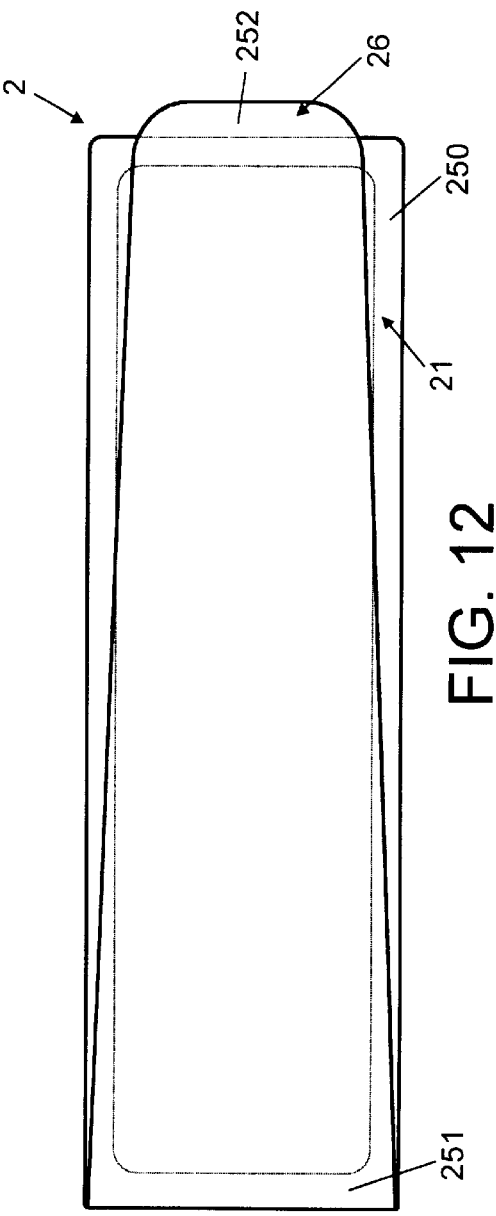
FIG. 12 is a top view of the element of the refill element according to the third embodiment corresponding to FIG. 10.

FIGS. 10 to 12 show variants in which the closing means (25) comprises an actual closing portion (250) of the receptacle (20) and a free portion (26) superposed with respect to the closing portion (250) and having a first end (251) located on the side on which the element is introduced into the device, the first end (251) being connected to the closing portion (250) so as to form a folded-back edge, and an opposite end (252) extending beyond the length of the receptacle and being capable of being reached manually after the refill has been placed in the device.

What is meant by "automatic dispensing device" is any type of dispensing device activating a cycle for the reconstitution of food preparations ready for consumption.

The invention is suitable for refilling pulverized food substances used to make drinks selected from roasted or ground coffee; soluble coffee; tea; chocolate-containing drinks; milk; flavored drinks based on fruits, herbs, sugar, leguminous plants, and natural or artificial aromas; as well as mixtures of these products in any proportion.

The invention is not, of course, limited only to the embodiments described, but may also relate to other embodiments which may be considered as equivalents or which come within the scope of the following claims.

What is claimed is:

1. A refill element for an automatic fluid dispensing device comprising a receptacle having a periphery within which is contained a predetermined quantity of a substance to be filled into the device and a closing member cooperating with the receptacle to form an enclosed chamber, wherein the closing member comprises a detachment portion adapted to engage a retaining part of the device to at least partially detach the closing member from the receptacle, wherein the substance is a pulverized or powdered food substance useful for the preparation of a drink.

2. The refill element of claim 1, wherein the detachment portion is an extension of the closing member that extends beyond the periphery of the receptacle.

3. The refill element of claim 2, wherein the detachment portion is adapted to engage the retaining part of the device when the refill element is introduced into the device, the retaining part being complementary to the detachment portion, so as to keep the extension in place when the refill element is introduced into the dispensing device.

4. The refill element of claim 3, wherein the detachment portion comprises at least one projecting portion on the extension adapted to engage the retaining part which is a complementary edge of the device, wherein the at least one projecting portion forms an abutment that bears on the complementary edge of the dispensing device when the refill element is introduced into the device.

5. The refill element of claim 3, wherein the detachment portion comprises at least one hole formed in the free portion, and the retaining part is a complementary rod portion on the device, wherein the at least one hole is adapted to engage with the complementary rod portion when the refill element is introduced into the device.

6. The refill element of claim 1, wherein the closing member comprises:
   an actual closing portion that cooperates with the receptacle to form an enclosed chamber; and
   a free portion superposed with respect to the actual closing portion, wherein the free portion has a first end and a second end, the first end being located on the side of the receptacle that is introduced into the device and is connected to the closing member so as to form a folded-back edge, and the second end extends beyond the side of the receptacle that is opposite to the side introduced into the receptacle and is capable of being reached manually after the refill element has been introduced into the device.

7. The refill element of claim 1, wherein the receptacle is in the form of an elongated tray having a cross section of substantially trapezoidal shape, wherein the larger base of the trapezoid is extended in a substantially identical plane by lateral edges, to which the closing member is detachably connected.

8. The refill element of claim 7, wherein the lateral edges extend over the entire periphery of the larger base of the trapezoid.

9. The refill element of claim 7, wherein the closing member is a flexible film joined to the lateral edges of the receptacle so that the closing member can be detached from the receptacle by delaminating at least a portion of the film from the edges of the receptacle.

10. The refill element of claim 9, wherein the flexible film is a moisture-resistant or tear-resistant material.

11. The refill element of claim 9, wherein the flexible film is heat-sealed to the lateral edges of the receptacle.

12. The refill element of claim 1, wherein the receptacle is made of a thermoformed, injected, extrusion blow-moulded, or injection blow-moulded plastic.

13. The refill element of claim 1 wherein the detachment portion comprises at least one projecting portion and the projecting portion(s) are located substantially at the periphery of the receptacle with the projection portions forming an abutment that is adapted to engage an edge of the dispensing device.

14. The refill element of claim 1 wherein the pulverized or powdered food substance is selected from one or more of roasted or ground coffee; soluble coffee; tea; pulverized or powdered chocolate-containing drink substance; pulverized or powdered milk; and pulverized or powdered flavoured drink substance based on fruits, herbs, sugar, leguminous plants, and natural or artificial aromas.

15. The refill element of claim 13 wherein the detachment portion comprises a plastic plate adhesively bonded or welded to the closing member.

16. An apparatus for automatically dispensing a fluid mixed with a substance comprising at least one substance-supply subassembly for supplying a substance to be mixed with a fluid, the substance-supply subassembly including:
   a housing for receiving at least one refill element of claim 1, by sliding the refill element into the housing when the refill element is oriented so that the closing member at least partially forms the bottom of the refill element;
   at least one receiving element for receiving the substance, the receiving element being located below the refill element so that the food substance falls into the receiving element when the closing member is detached from the receptacle;
   means for metering the substance in the receiving element into a mixing bowl; and
   retaining means for engaging the detachment portion of the refill element when the refill element is slid into the housing to at least partially detach the closing member from the refill element.

17. The apparatus of claim 16, further comprising a fluid supply to supply fluid to the mixing bowl and a dispensing outlet for dispensing the substance dispersed or dissolved in the fluid.

18. The apparatus of claim 17, further comprising a mashing chamber that includes an agitator for the production of froth located between the mixing bowl and the dispensing outlet.

19. The apparatus of claim 16, wherein the metering means is a screw arranged horizontally and substantially oriented in the vertical plane in which the refill element extends longitudinally.

20. The apparatus of claim 16, wherein the housing further comprises a guide means in the form of two laterally spaced rails to ensure that the refill element slides in a substantially horizontal plane when inserted into the subassembly.

21. The apparatus according to claim 16, wherein the retaining means includes at least one transverse edge of the housing that the detachment means comes into abutment with when the refill element is introduced into the housing.

22. The apparatus of claim 16, wherein the retaining means includes at least one rod portion onto which the detachment portion engages when the refill element is being introduced into the housing.

23. The apparatus of claim 16, wherein the receiving element is a funnel or hopper having widened edges.

24. The apparatus of claim 16, comprising a plurality of supply subassemblies wherein the subassemblies are arranged parallel to each other in communication with a common mixing bowl.

25. The apparatus of claim 16, wherein the housing is arranged to receive more than one refill element with each refill element arranged in a vertical stack after being introduced into the device.

26. A drink-dispensing apparatus comprising:
   at least one refill element for refilling the dispensing device with a pulverized substance, wherein the refill element comprises a receptacle in the form of an elongated tray containing the pulverized substance within its periphery and a detachable film that cooperates with the refill element to form an enclosed chamber, wherein the film has a foldable free portion that extends beyond the periphery of the receptacle, the free portion being provided with a detachment portion; and
   a dispensing device comprising a housing for receiving the refill element and a retaining part which engages the detachment portion when the refill element is introduced into the housing, so that the movement of introducing the refill element into the housing causes the film to be delaminated from the refill element so that the substance is released into the dispensing device by gravity.

27. The drink-dispensing apparatus of claim 26 wherein the pulverized substance comprises a food substance.

28. A refill element for an automatic fluid dispensing device comprising a receptacle having a periphery within which is contained a predetermined quantity of a substance to be filled into the device and a closing member cooperating with the receptacle to form an enclosed chamber, wherein the substance is a pulverized or powdered food substance, wherein the closing member comprises a detachment portion bearing at least one catching means adapted to engage a retaining part of the device to at least partially detach the closing member from the receptacle, and wherein the receptacle comprises guiding means adapted to slidably guide the refill element in the dispensing device while the catching means is capable of engaging the retaining part of the device.

29. The refill element of claim 28 wherein the guiding means comprises lateral edges of the receptacle which extends over the entire periphery of the receptacle.

30. The refill element of claim 28, wherein the detachment portion is adapted to engage the retaining part of the device when the refill element is introduced into the device, the retaining part being complementary to the detachment portion, so as to keep the extension in place when the refill element is introduced into the dispensing device.

31. The refill element of claim 28, wherein the catching means comprises at least one projecting portion on the extension adapted to engage a complementary edge of the device, wherein the at least one projecting portion forms an abutment that bears on the complementary edge of the dispensing device when the refill element is introduced into the device.

32. The refill element of claim 28 wherein the pulverized or powdered food substance comprises roasted or ground coffee; soluble coffee; tea; pulverized or powdered chocolate-containing drink substance; milk substance; a drink substance based on one or more of fruits, herbs, sugar, leguminous plants, natural aroma, and artificial aromas, or mixtures thereof.

33. The refill element of claim 28 wherein the detachment portion is an extension of the closing member that extends beyond the periphery of the receptacle.

34. A refill element for an automatic fluid dispensing device comprising a receptacle having a periphery within which is contained a predetermined quantity of a substance comprising a pulverized or powdered food to be filled into the device and a closing member cooperating with the receptacle to form an enclosed chamber, wherein the closing member comprises a detachment portion that is adapted to engage a retaining part of the device to at least partially detach the closing member from the receptacle, and wherein the receptacle is made of a thermoformed, injected, extrusion blow-molded, or injection blow-molded plastic.

35. The refill element of claim 34 wherein the detachment portion comprises at least one projecting portion and the detachment portion is substantially at the periphery of the receptacle with the projection portions forming an abutment that is adapted to engage an edge of the dispensing device.

* * * * *

UNITED STATES PATENT AND TRADEMARK OFFICE
CERTIFICATE OF CORRECTION

PATENT NO. : 6,289,948 B1  Page 1 of 1
DATED : September 18, 2001
INVENTOR(S) : Jeannin et al.

It is certified that error appears in the above-identified patent and that said Letters Patent is hereby corrected as shown below:

Column 9,
Line 14, change "clement" to -- element --
Line 19, after "substance" insert -- comprising a pulverized or powdered food --

Column 10,
Line 43, change "clement" to -- element --

Signed and Sealed this

Fifth Day of March, 2002

Attest:

JAMES E. ROGAN
Attesting Officer    Director of the United States Patent and Trademark Office